United States Patent
Ahmed et al.

(10) Patent No.: US 9,053,232 B2
(45) Date of Patent: Jun. 9, 2015

(54) METHOD AND APPARATUS FOR SUPPORTING A UNIFIED DEBUG ENVIRONMENT

(71) Applicant: Altera Corporation, San Jose, CA (US)

(72) Inventors: Muhammad Ahmed, Hayward, CA (US); Manoj Reghunath, Austin, TX (US)

(73) Assignee: Altera Corporation, San Jose, CA (US)

( * ) Notice: Subject to any disclaimer, the term of this patent is extended or adjusted under 35 U.S.C. 154(b) by 215 days.

(21) Appl. No.: 13/715,161

(22) Filed: Dec. 14, 2012

(65) Prior Publication Data
US 2014/0173343 A1 Jun. 19, 2014

(51) Int. Cl.
*G06F 11/00* (2006.01)
*G06F 11/36* (2006.01)
*G06F 11/27* (2006.01)

(52) U.S. Cl.
CPC ............ *G06F 11/3648* (2013.01); *G06F 11/27* (2013.01); *G06F 11/3664* (2013.01)

(58) Field of Classification Search
CPC ... G06F 11/3648; G06F 11/261; G06F 11/26; G06F 11/25; G06F 11/27; G06F 11/273; G06F 11/36; G06F 11/3636; G06F 11/3656; G06F 11/3664
USPC ........ 714/30, 10, 25, 27, 37, 38.1, 39, 40, 45, 714/46, 47.1, 57
See application file for complete search history.

(56) References Cited

U.S. PATENT DOCUMENTS

| | | | |
|---|---|---|---|
| 6,826,717 B1 * | 11/2004 | Draper et al. | 714/39 |
| 7,539,900 B1 * | 5/2009 | Plofsky | 714/30 |
| 8,407,525 B2 * | 3/2013 | Vorbach | 714/38.1 |
| 2006/0143526 A1 * | 6/2006 | So et al. | 714/31 |
| 2007/0168749 A1 * | 7/2007 | Stewart et al. | 714/39 |

* cited by examiner

*Primary Examiner* — Joseph D Manoskey
(74) *Attorney, Agent, or Firm* — L. Cho (57) ABSTRACT

A field programmable gate array (FPGA) includes a soft processor and a soft processor debug unit implemented by programmable logic on the FPGA. The FPGA includes a system on a chip (SOC) that includes a hard processor and a hard processor debug unit. The FPGA includes a bus bridge, coupled to an input output (IO) of the FPGA, operable to transmit data between the IO and the soft processor debug unit and the hard processor debug unit.

22 Claims, 7 Drawing Sheets

METHOD AND APPARATUS FOR SUPPORTING A UNIFIED DEBUG ENVIRONMENT

FIELD

Embodiments of the present invention relate to tools for designing systems on target devices that include programmable logic and an integrated circuit that includes a processor. More specifically, embodiments of the present invention relate to a method and apparatus for supporting a unified debug environment for debugging code executed on a processor implemented by the programmable logic and code executed on the processor on the integrated circuit.

BACKGROUND

A debugger or debugging tool is a computer program that is used to test and debug other programs, often referred to as a "target" program running on a target processor. The code in the target program may be run on an instruction set simulator. Running code in an instruction set simulator allows execution of the code to be halted when specific conditions are encountered. A "crash" occurs when a program cannot normally continue because of a programming bug. For example, a program might have tried to use an instruction not available on a current version of a processor or attempt to access unavailable or protected memory. When a program crashes or reaches a preset condition, the debugger typically shows the location in the original code if it is a source-level debugger or symbolic debugger. If the debugger is a low-level debugger or a machine-language debugger, it may show the line in the disassembly.

Some debuggers offer functions such as running a program step-by-step ("single-stepping", stopping at some event or specified instruction by means of a breakpoint ("breaking"), and tracking values of variables. Some debuggers have the ability to modify program state while it is running. It may also be possible to continue execution at a different location in the program to bypass a crash or logical error.

In order for a debugger or debugging tool to analyze a target program running on a target processor, the debugger or debugging tool needs to be aware of the tools available to debug the target program and have access to the target processor.

SUMMARY

According to embodiments of the present invention, a method and apparatus for supporting a unified debug environment is disclosed. These embodiments allow a designer to debug code running on a soft processor implemented on a field programmable gate array (FPGA) and a hard processor on system on a chip (SoC) using a single debug environment where a single debugging program executed on a single host computer is connected to a single port associated with the devices.

According to an embodiment of the present invention, an FPGA includes a soft processor and a soft processor debug unit implemented by programmable logic on the FPGA. The FPGA includes a system on a chip (SOC) that includes a hard processor and a hard processor debug unit. The FPGA also includes a bus bridge, coupled to an input output (IO) of the FPGA, operable to transmit data between the IO and the soft processor debug unit and the hard processor debug unit. The hard processor debug unit includes a memory that identifies tools available on the hard processor debug unit for debugging the hard processor. The soft processor debug unit includes a memory that identifies tool available for debugging the soft processor.

According to an embodiment of the present invention, a method for designing a system on a target device includes synthesizing a design for the system that includes a debug unit with tools to debug a soft processor in the system. The system is placed on the target device. The system is routed on the target device. A debug unit identification file is generated for programming a memory on the target device to identify the tools and locations of the tools on the target device. The memory may be read by a host debugger at a later time to discover the tools available to debug the soft processor. According to an aspect of the present invention, routing the system includes generating a bus to connect a bus bridge to the tools to debug the soft processor.

According to an embodiment of the present invention, a method for debugging a system includes reading a first memory on a system on a chip (SOC) on a field programmable gate array to identify tools available to debug a hard processor on the SOC. A second memory, on the FPGA and external to the SOC, is read. The second memory is identified by the first memory and identifies tools available to debug a soft processor implemented using programmable logic on the FPGA.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, procedures, and programs are shown in block diagram form to avoid obscuring embodiments of the present invention unnecessarily.

Figure 1:
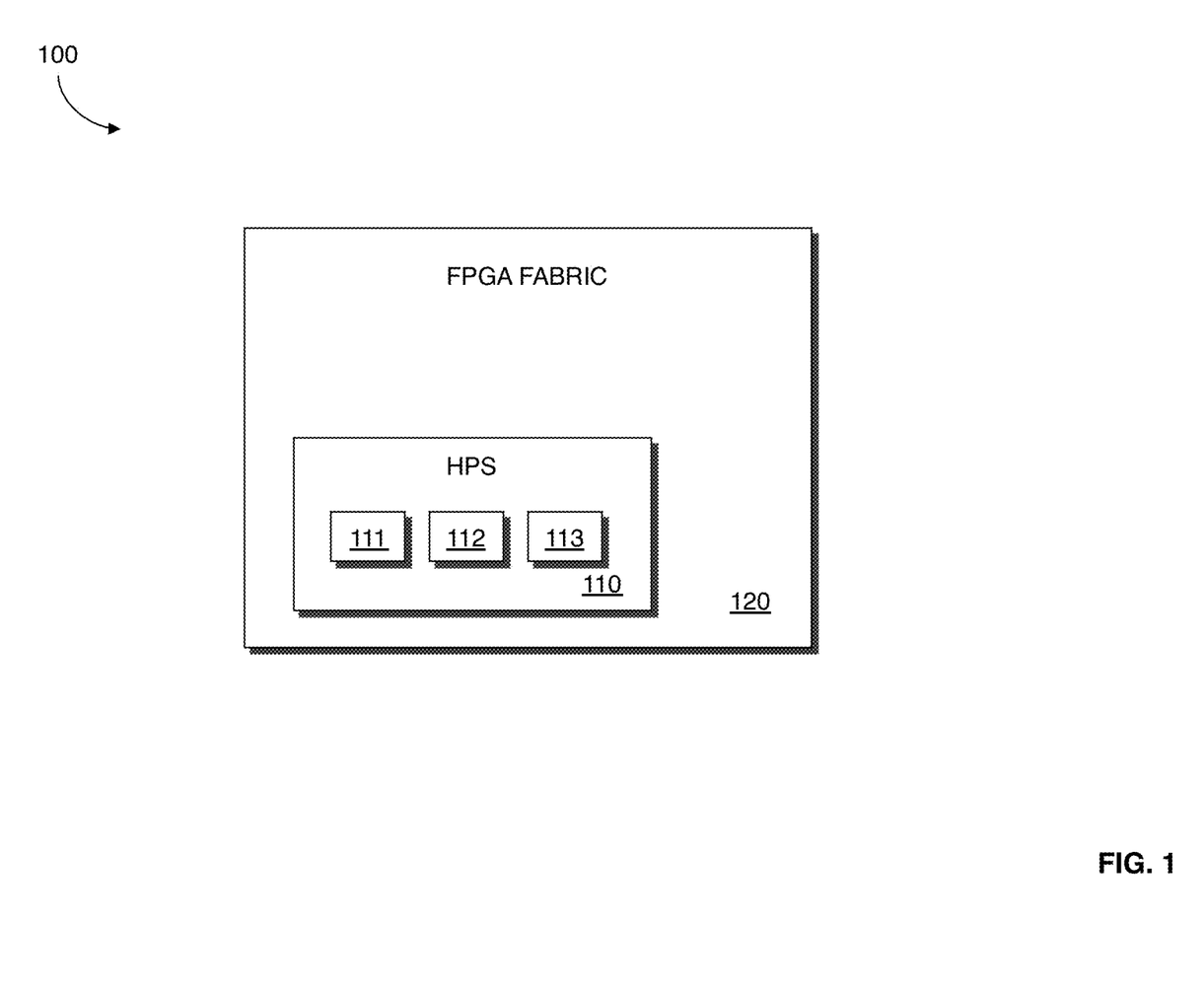
FIG. 1 illustrates a system on a chip (SoC) field programmable gate array (FPGA) hard processor system according to an embodiment of the present invention.

FIG. 1 illustrates a target device 100 that includes a system on a chip (SoC) field programmable gate array (FPGA) hard processor system according to an embodiment of the present invention. According to an embodiment of the present invention, the SoC FPGA may also be referred to as a "hybrid FPGA". The target device 100 integrates a hard processor system (HPS) 110, that includes a hard processor, peripherals, and a memory controller, with an FPGA fabric 120 using a high band-bandwidth interconnect backbone.

According to an embodiment of the present invention, the hard processor system 110 is implemented as a SoC. The hard processor system 110 includes one or more hard processors 111. Each of the one or more hard processors 111 may include one or more processor cores and one or more level 1 cache. The hard processor system 110 includes embedded peripherals 112 which eliminate the need to implement functionality in programmable logic. This leaves more FPGA resources for application specific custom logic and reduces power consumption. The hard processor system 110 also implements a multiport memory controller 113 that may be shared by the hard processor and logic on the FPGA fabric 120. The memory controller may support a variety of memories and memory protocols. It should be appreciated that the hard processor system 110 may include other components that support other operations and functionalities. Although the hard processor system 110 is implemented on a SoC that is connected to the FPGA fabric 120, the hard processor system 110 is not considered to be part of the FPGA fabric 120 as none of the components in the hard processor system 110 is implemented using programmable logic from the FPGA fabric 120.

According to an embodiment of the present invention, the FPGA fabric 120 includes programmable logic that allows implementation of custom IP or off-the shelf preconfigured IP. The flexibility of the FPGA fabric 120 allows designers to adapt to varying or changing interface and protocol standards, and add custom hardware through use of the programmable logic to accelerate time-critical algorithms. An exemplary embodiment of the FPGA fabric 120 is illustrated in FIG. 2.

The SoC FPGA hard processor system on the target device 100 combines the features of an embedded processor with programmable logic to provide a number of advantages. These include reducing system power, cost, and board space by eliminating a need for a discrete embedded processor, differentiating the end product in both hardware and software, adding support for virtually an interface standard in FPGA, and extending product life and revenue through hardware and software updates in the field.

Figure 2:
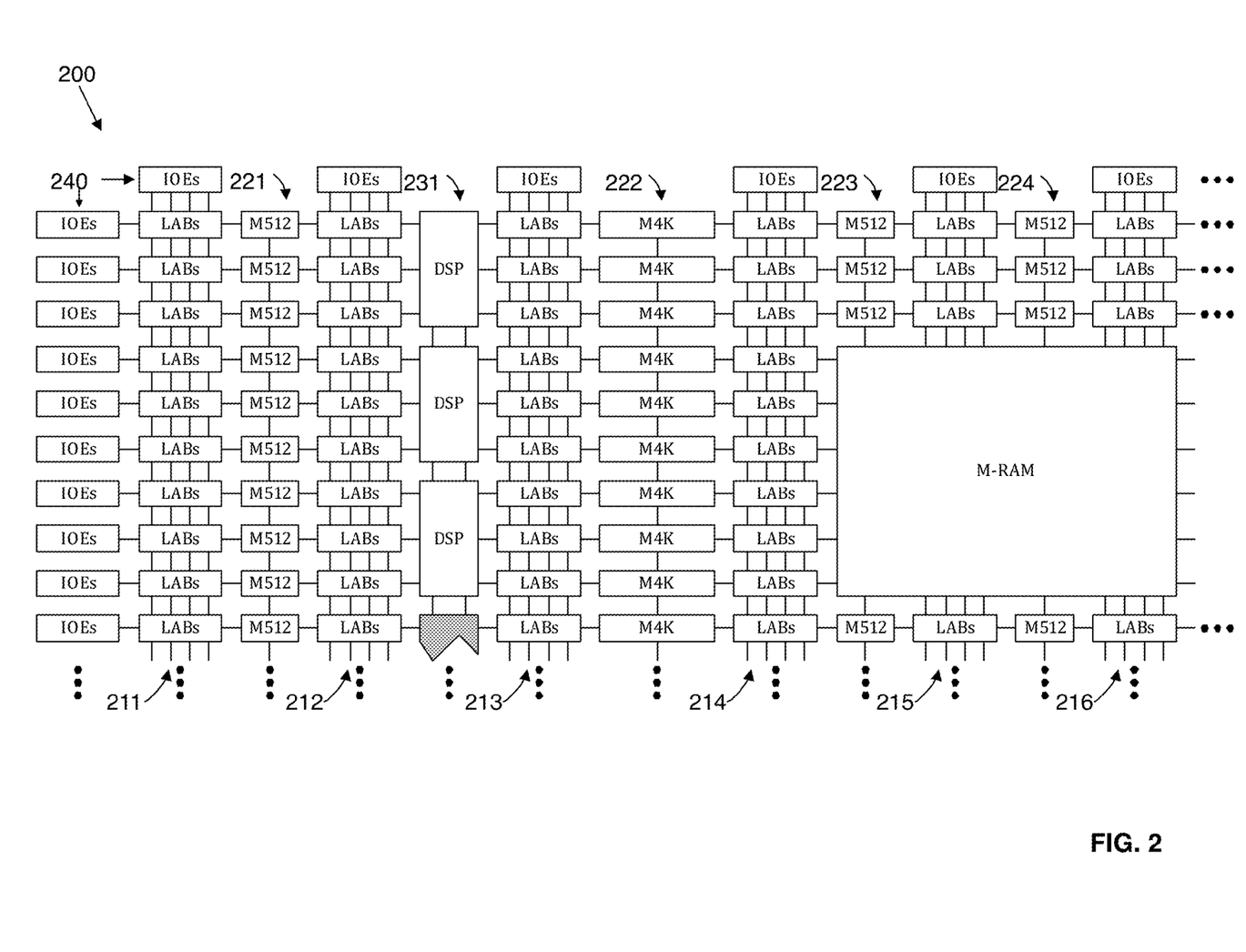
FIG. 2 illustrates exemplary FPGA components according to an embodiment of the present invention.

FIG. 2 illustrates a portion of a device 200 that may be used to implement the FPGA fabric 120 illustrated in FIG. 1 according to an embodiment of the present invention. The device 200 includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix devices manufactured by Altera Corporation. LABs are grouped into rows and columns across the device 200. Columns of LABs are shown as 211-216. It should be appreciated that the logic block may include additional or alternate components.

The device 200 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 200. Columns of memory blocks are shown as 221-224.

The device 200 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 200 and are shown as 231.

The device 200 includes a plurality of input/output elements (IOEs) 240. Each IOE feeds an IO pin (not shown) on the device 200. The IOEs 240 are located at the end of LAB rows and columns around the periphery of the device 200. Each IOE may include a bidirectional IO buffer and a plurality of registers for registering input, output, and output-enable signals.

The device 200 may include routing resources such as LAB local interconnect lines, row interconnect lines ("H-type wires"), and column interconnect lines ("V-type wires") (not shown) to route signals between components on the target device.

It should be appreciated that the FPGA fabric illustrated as 120 and 200 may be used to implement a soft processor. A soft processor is a microprocessor that can be implemented using logic synthesis. The soft processor may execute code, operate, and perform functionalities similar to that of a hard processor implemented using dedicated hardware components.

Figure 3:
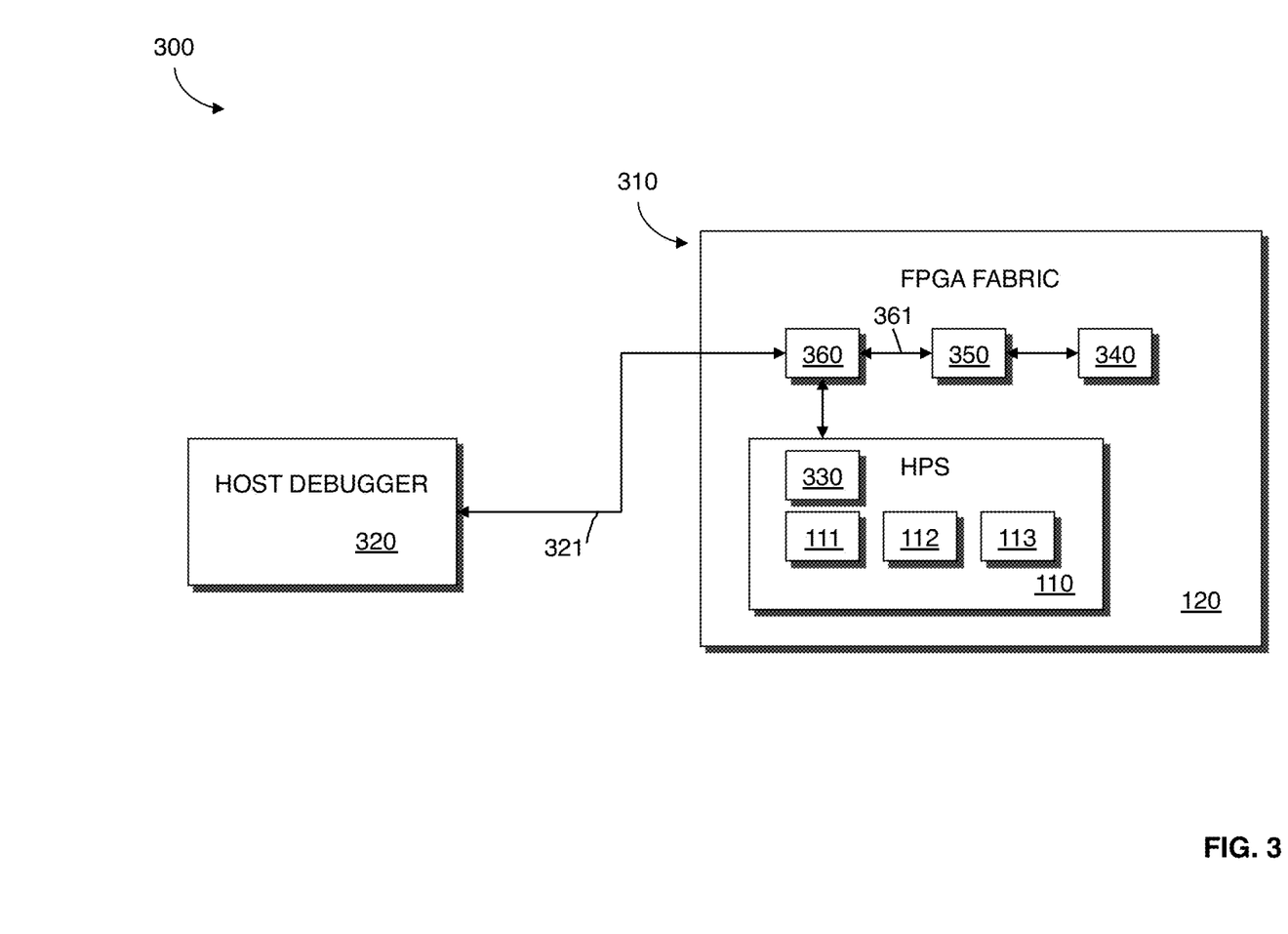
FIG. 3 illustrates a debug environment for an exemplary SoC FPGA according to an embodiment of the present invention.

FIG. 3 illustrates a debug environment 300 for an exemplary SoC FPGA 310 according to an embodiment of the present invention. The SoC FPGA 310 may be implemented in part by the target device 100 illustrated in FIG. 1. Components on SoC FPGA 310 having similar reference numbers as components on the target device 100 may perform similar functionalities. The debug environment 300 includes a host debugger 320. The host debugger 320 is a computer system that executes a computer program that may be used to test and debug programs running on the hard processor 111 on the hard processor system 110 and/or a soft processor 340 implemented using programmable logic on the FPGA fabric 120. The host debugger 320 is connected to the SoC FPGA 120 via one or more connections and/or connectors 321. According to an embodiment of the present invention, the connection 321 may be implemented by a Universal Serial Bus (USB)/Ethernet to Joint Test Action Group (JTAG) connector.

Both the hard processor 111 on the hard processor system 110 and the soft processor 340 on the FPGA fabric 120 have a debug unit associated with them. Hard processor debug unit 330 and soft processor debug unit 350 include debug components that may also be referred to as "debug tools". The debug components operate to allow the host debugger 320 to interface, communicate, and control the target processor and retrieve data from the target processor as it executes the target program. The hard processor debug unit 330 includes a memory (not shown) written with information that identifies the debug components in the hard processor debug unit 330 and their locations. In order for the host debugger 320 to test and debug programs running on the hard processor 111, the host debugger 320 must identify the debug components on the hard processor system 110 that are available for it to use. The host debugger 320 discovers the debug capabilities of the hard processor system 110 by reading the contents of the memory. The memory in the hard processor debug unit 330 may identify and point to the memory in the soft processor debug unit 350 (not shown) which identifies other debug components in the debug unit 350 and their locations. This allows the host debugger 320 to further discover the debug capabilities of the soft processor 340 so that it can also test and debug programs running on the soft processor 340. According to an embodiment of the present invention, the information written in the memories include the profile of a debug component and an address of the debug component. It should be appreciated that the memory in the hard processor debug unit 330 and memory in the soft processor debug unit 350 may point to other memories associated with other debug units of other processors to further identify debug components available to the host debugger 320. This would further provide the host debugger 320 with the capability to test and debug target programs executed on other target processors.

By identifying the debug components and locations of the debug components in memories and providing a pointing system where memories may be daisy chained together, the host debugger 320 may discover the debug capabilities of an FPGA fabric 120 which are not known at the time of an SoC's tapeout. The host debugger 320 may also discover the debug capabilities of other debug units associated with other processors that may be later connected to the SoC FPGA 310.

A bus bridge 360 may be implemented such that it is coupled to an input output port (not shown) of the SoC FPGA 310. The bus bridge 360 receives data transmitted from the host debugger 320 via the input output port. The bus bridge 360 includes an address decoder (not shown) that identifies which of the hard processor debug unit 330 and soft processor debug unit 350 specific data should be routed to. The bus bridge 360 also includes a data multiplexer and de-multiplexer (not shown) that packages data from the hard processor debug unit 330 and the soft processor debug unit 350 and disassembles packaged data received from the host debugger 320. The packaged data may be transmitted between the host debugger 320 and the bus bridge 360 via the input output port and connector 321 on a single stream of data. The bus bridge 360 allows the host debugger 321 to communicate with the hard processor debug unit 330 and the soft processor debug unit 350 over a single input output port. This reduces the number of connections and connectors between the host debugger 320 and the SoC FPGA 310 and allows debugging of hard processor 111 and soft processor 340 to be achieved using a single host debugger 320. A dedicated bus 361 is implemented to provide a connection between the bus bridge 360 and the soft processor debug unit 350.

As illustrated in FIG. 3, the bus bridge 360 is implemented using programmable logic from the FPGA fabric 120. It should be appreciated that the bus bridge 360 may be implemented using other techniques. For example, the bus bridge 360 may by implemented using a component residing on the hard processor system 110 in the SoC. Alternatively, the bus bridge 360 may be implemented by an independent chip that is connected to the FPGA fabric 110.

The host debugger 320 may utilized the single stream of data that includes data from the hard processor debug unit 330 and the soft processor debug unit 350 to uniquely analyze the relationship of the code being executed on the hard processor 111 and soft processor 340. The host debugger 320 may be able to determine how code from one processor affects code executed on the other processor. The host debugger 320 may also present insightful views where the target program executed on the hard processor 111 and the target program executed on the soft processor 340 are analyzed side by side.

Figure 4:
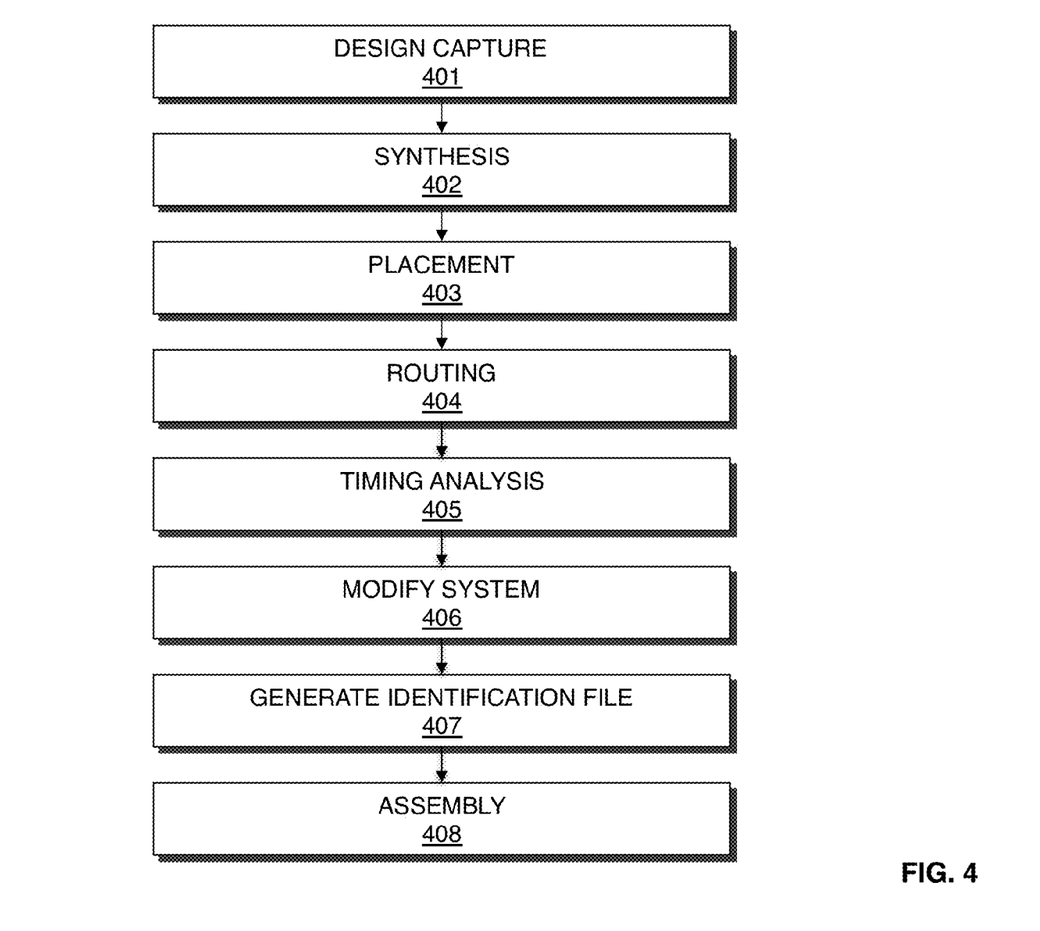
FIG. 4 is a flow chart illustrating a method for designing a system on a target device according to an embodiment of the present invention.

FIG. 4 is a flow chart illustrating a method for designing a system on a target device according to an embodiment of the present invention. The target device may be a SoC FPGA. According to one embodiment, the procedure illustrated in FIG. 4 may be performed by a computer aided design (CAD)/electronic design automation (EDA) tool implemented on a computer system. At 401, a description of a system is generated in a design capture procedure. According to an embodiment of the present invention, a hardware description language (HDL) design definition is generated to describe the system. The HDL is generated in response to specifications of the system provided by a designer. The specifications may be provided through a design entry tool. The specifications may describe components and interconnections in the system. According to an embodiment of the present invention, a design for a soft processor and a soft processor debug unit is generated during the design capture procedure. The debug unit includes one or more debug components (debug tools) that may be used by a host debugger to interface, communicate, and control the soft processor and retrieve data from the soft processor as it executes the target program. According to an embodiment of the present invention, one of the tools comprises a cross trigger interface that holds operation of the processor. Other debug tools may include, for example, a trace port interface, embedded trace buffer/macrocell, and/or other components. A design for a bus bridge for routing data between an input out of the target device and the soft processor debug unit and a hard processor debug unit is also generated.

At 402, the system, which includes the soft processor, soft processor debug unit, and bus bridge, is synthesized. Synthesis includes generating a logic design of the system to be implemented by the target device. According to an embodiment of the present invention, synthesis generates an optimized logical representation of the system from the HDL design definition. Synthesis also includes mapping the optimized logic design. Mapping includes determining how to implement logic gates and logic elements in the optimized logic representation with specific resources on the target device. According to an embodiment of the present invention, a netlist is generated from mapping. This netlist may be an optimized technology-mapped netlist generated from the HDL.

At 403, the system is placed. According to an embodiment of the present invention, placement involves placing the mapped logical system design on the target device. Placement works on the technology-mapped netlist to produce a placement for each of the functional blocks. According to an embodiment of the present invention, placement includes fitting the system on the target device by determining which resources on the logic device are to be used for specific logic elements, and other function blocks, determined to implement the system during synthesis. Placement may include clustering which involves grouping logic elements together to form the logic clusters present on the target device. According to an embodiment of the present invention, clustering is performed at an early stage of placement and occurs directly after synthesis during the placement preparation stage.

At 404, the placed design is routed. During routing, routing resources on the target device are allocated to provide interconnections between logic gates, logic elements, and other components on the target device. According to an embodiment of the present invention, routing includes generating a bus to connect the bus bridge to the software debug unit to debug the software processor. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design.

At 405, timing analysis is performed on the system designed by procedures 401-404. According to an embodiment of the present invention, the timing analysis determines whether timing constraints of the system are satisfied.

At 406, the design for the system is modified in response to the timing analysis. According to an embodiment of the present invention, the design for the system may be modified in response to determining that timing constraints have not been satisfied. The design for the system may be modified by a designer manually or alternatively the design may be modified automatically by the EDA tool by re-executing one or more of procedures 402-404. It should also be appreciated that each procedure may perform this optimization in its first invocation by performing the analysis during its execution.

At 407, a soft processor debug unit identification file is generated. The soft processor debug unit identification file may be used for programming a memory on the target device to identify the debug components (debug tools) and locations of the debug components on the target device. The soft processor debug unit identification file may include a profile of the debug components associated with the soft processor and their addresses. According to an embodiment of the present invention, a configuration file is also generated for each of the debug components, wherein the configuration file identifies peripheral identification registers for the debug component.

At 408, an assembly procedure is performed. The assembly procedure involves creating a data file that includes information determined by the procedures described at 401-407. The data file may be a bit stream that may be used to program a target device. According to an embodiment of the present invention, the procedures illustrated in FIG. 4 may be performed by an EDA tool executed on a first computer system. The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium. The target device may be programmed with the data file. By programming the target with the data file, components on the target device are physically transformed to implement the system.

Figure 5:
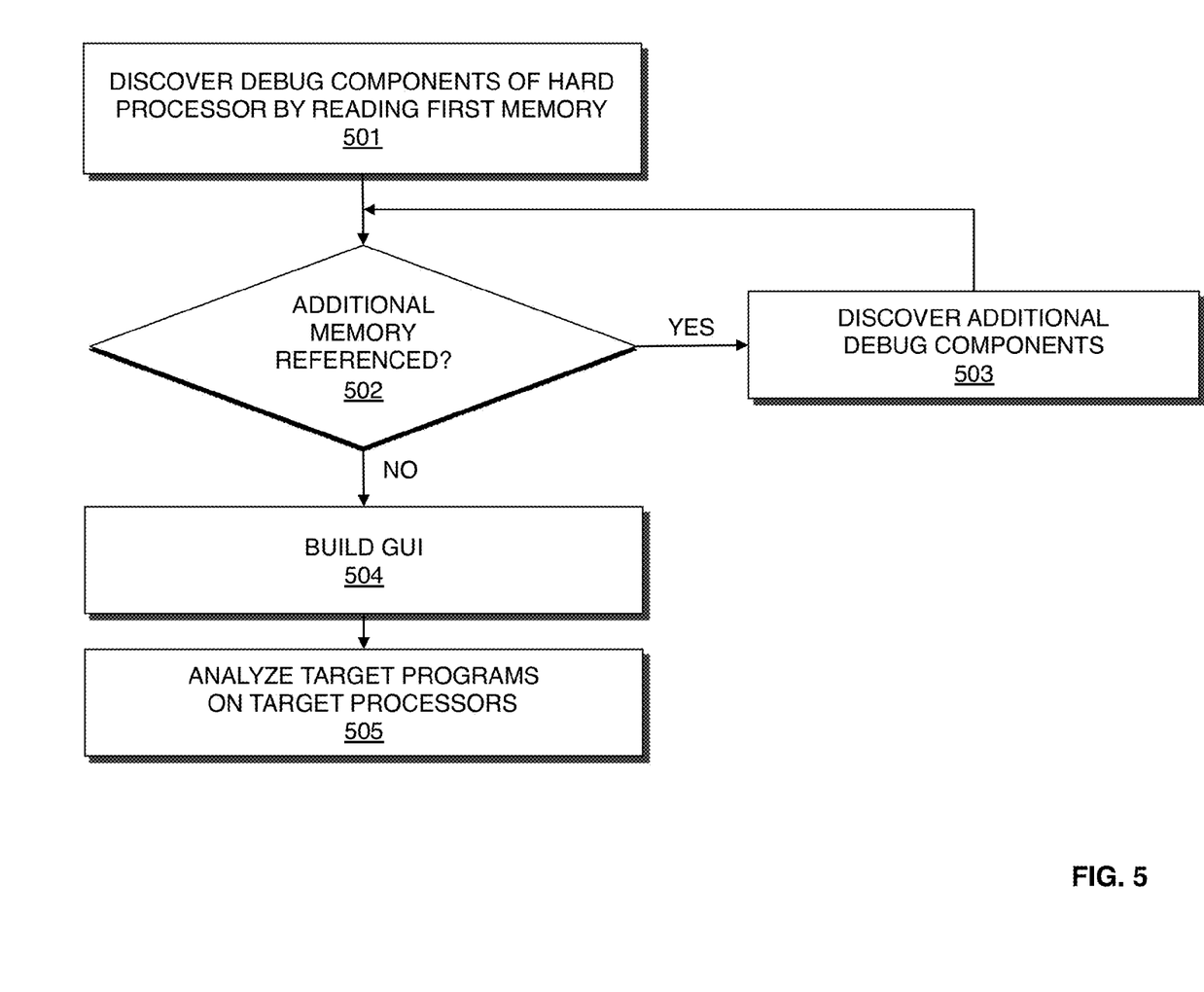
FIG. 5 is a flow chart illustrating a method for debugging a system according to an embodiment of the present invention.

FIG. 5 is a flow chart illustrating a method for debugging a system according to an embodiment of the present invention. According to one embodiment, the procedure illustrated in FIG. 5 may be performed by a host debugger implemented on a computer system. At 501, debug components associated with a hard processor debug unit are discovered. According to an embodiment of the present invention, the debug components are discovered by reading a memory on the hard processor debug unit. The memory stores the identity and location of the debug components. According to an embodiment of the present invention, the memory stores a profile and address of each of the debug components as well as a configuration file that identifies peripheral identification registers for a debug component.

At 502, it is determined whether an additional memory is referenced. According to an embodiment of the present invention, an additional memory may be referenced by the previous memory read, and determining whether an additional memory is referenced may be achieved by reading the previous memory. The additional memory may reside on the same chip as the previous memory or may reside off the chip or on a different chip. If an additional memory is referenced, control proceeds to 503. If an additional memory is not referenced, control proceeds to 504.

At 503, additional debug components are discovered by reading the memory referenced. The additional debug components may be associated with the previous processor or may be associated with a different processor. The memory referenced stores the identity and location of the additional debug components. According to an embodiment of the present invention, the memory stores a profile and address of each of the debug components as well as a configuration file that identifies peripheral identification registers for a debug component. It should be appreciated that the methodology described here allows for n number of memories to be linked together where each of the memories may identify debug components associated with a unique processor. The number n may be any number of memories or processors that may be supported by a system as connected on one or more boards. Control returns to 502 to determine whether additional memory may be referenced on this recently read memory.

At 504, a graphical user interface (GUI) is built for the debug components discovered. According to an embodiment of the present invention, the GUI is built using information associated with the debug component read at 503 and from information residing on the host debugger.

At 505, target programs executed on the target processors are analyzed. According to an embodiment of the present invention, the target programs are analyzed using the debug components discovered at 501 and 503.

Embodiments of the present invention allow designers to add debug components to an FPGA fabric that can interact with a host debugger. Designers may license standard debug components and add them to the FPGA fabric and/or design their own debug components. Embodiments of the present invention offer a solution that was not available in the past where a host debugger was limited to using only debug components fixed on a hard processor system implemented by a SoC at tapeout.

FIGS. 4 and 5 are flow charts that illustrate embodiments of the present invention. The procedures described in FIG. 4 may be performed by an EDA tool implemented by a computer system. The procedures described in FIG. 5 may be performed by a host debugger implemented by another computer system. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 6:
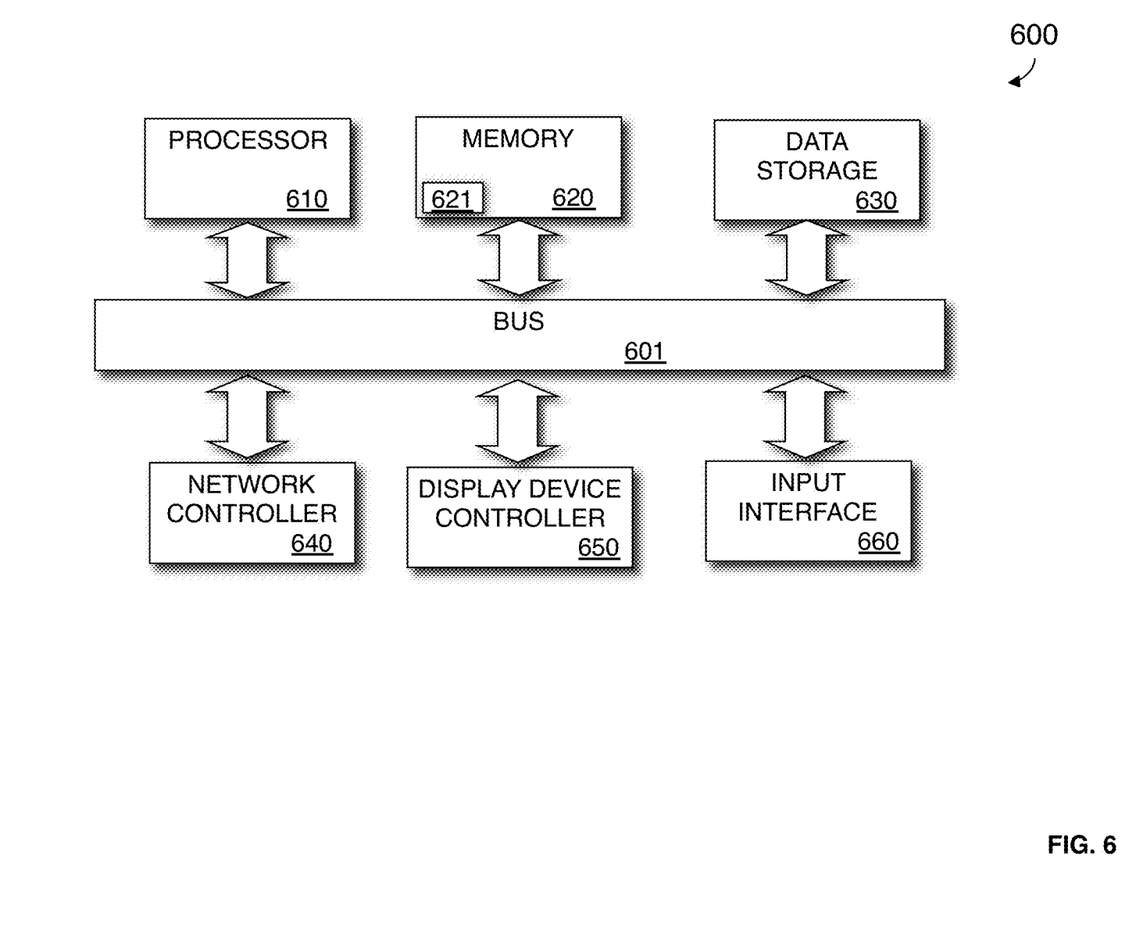
FIG. 6 illustrates a block diagram of a computer system implementing a system designer according to an embodiment of the present invention.

FIG. 6 is a block diagram of an exemplary computer system 600 in which an example embodiment of the present invention resides. The computer system 600 includes a processor 610 that process data signals. The processor 610 is coupled to a bus 601 or other switch fabric that transmits data signals between processor 610 and other components in the computer system 600. The computer system 600 includes a memory 620. The memory 620 may store instructions and code represented by data signals that may be executed by the processor 610. A data storage device 630 is also coupled to the bus 601.

A network controller 640 is coupled to the bus 601. The network controller 640 may link the computer system 600 to a network of computers (not shown) and supports communication among the machines. A display device controller 650 is coupled to the bus 601. The display device controller 650 allows coupling of a display device (not shown) to the computer system 600 and acts as an interface between the display device and the computer system 600. An input interface 660 is coupled to the bus 601. The input interface 660 allows coupling of an input device to the computer system 601 and transmits data signals from an input device to the computer system 600. It should be appreciated that computer systems having a different architecture may also be used to implement the computer system 600.

A system designer 621 may reside in memory 620 and be executed by the processor 600. The system designer 621 may operate to perform design capture and generate a design for a system, synthesize the system, place the system on a target device, route the system on the target device, perform timing analysis, generate an identification file, and assemble the system. Alternatively, a debug program 621 may reside in memory 620 and be executed by the processor 600. The debug program 621 may operate to discover debug components of a hard processor and a soft processor on a target device. The debug program 621 may utilize the debug components of both the hard processor and the soft processor to provide unified debug environment.

Figure 7:
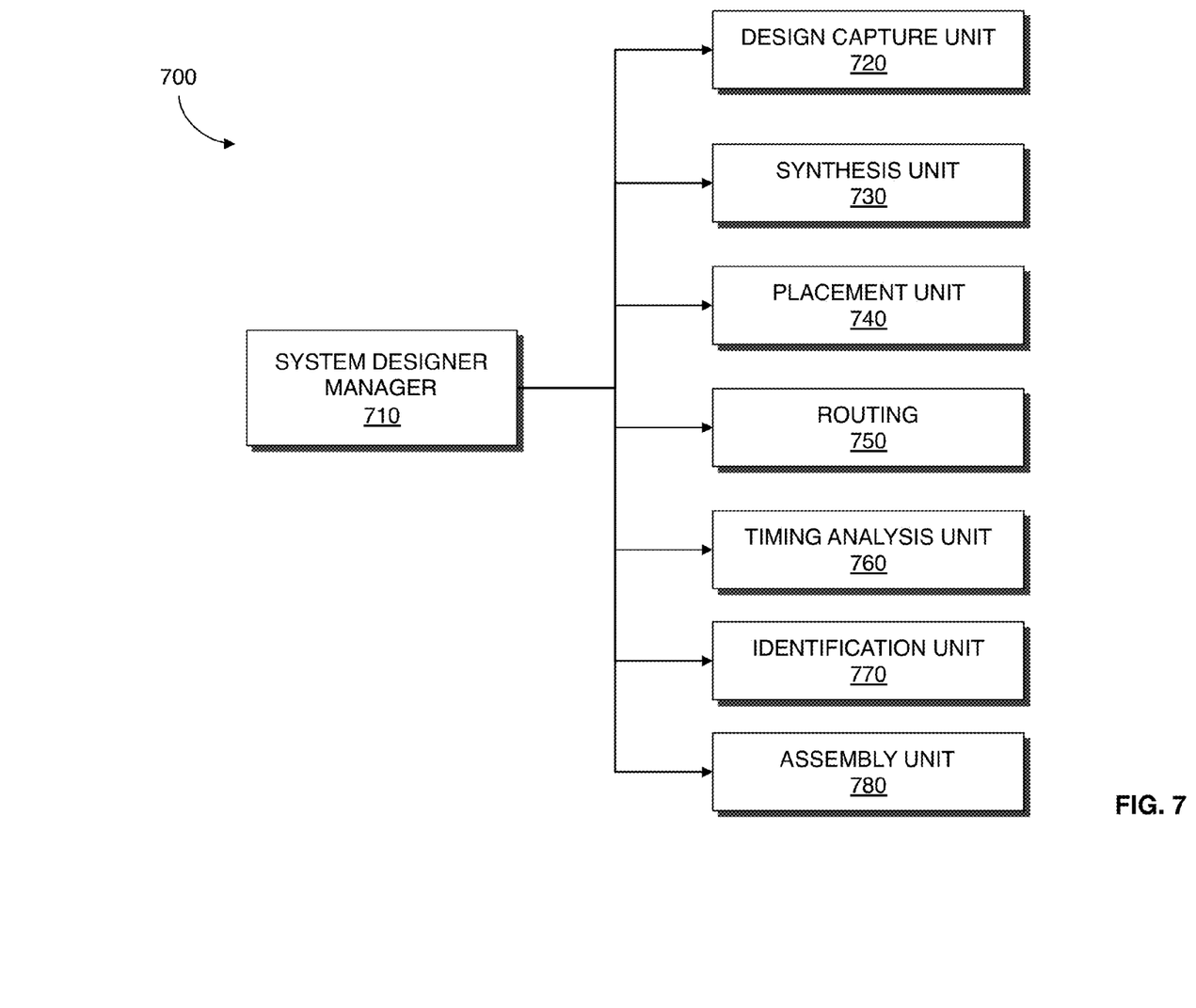
FIG. 7 is a block diagram of a system designer according to an embodiment of the present invention.

FIG. 7 illustrates a system designer 700 according to an embodiment of the present invention. The system designer 700 may be an EDA tool for designing a system on a target device such as an SoC FPGA or other circuitry. FIG. 7 illustrates modules implementing an embodiment of the system designer 700. According to one embodiment, the modules represent software modules and system design may be performed by a computer system such as the one illustrated in FIG. 6 executing sequences of instructions represented by the modules shown in FIG. 7. Execution of the sequences of instructions causes the computer system to support system design as will be described hereafter. In alternate embodiments, hard-wire circuitry may be used in place of or in combination with software instructions to implement embodiments of the present invention. Thus, embodiments of the present invention are not limited to any specific combination of hardware circuitry and software.

The system designer 700 includes a designer manager 710. The designer manager 710 is connected to and transmits data between the components of the system designer 700.

The system designer 700 includes a design capture unit 720. According to an embodiment of the present invention, a hardware description language (HDL) design definition is generated to describe the system. The HDL is generated in response to specifications of the system provided by a designer. The specifications may describe components and interconnections in the system. According to an embodiment of the present invention, a design for a soft processor and a soft processor debug unit is generated during the design capture procedure. The debug unit includes one or more debug components (debug tools) that may be used by a host debugger to interface, communicate, and control the soft processor and retrieve data from the soft processor as it executes the target program. According to an embodiment of the present invention, one of the tools comprises a cross trigger interface that holds operation of the processor. Other debug tools may include, for example, a trace port interface, embedded trace buffer/macrocell, and/or other components. A design for a bus bridge for routing data between an input out of the target device and the soft processor debug unit and a hard processor debug unit is also generated.

The system designer 700 includes a synthesis unit 730 that performs synthesis. The synthesis unit 730 generates a logic design of a system to be implemented on the target device that includes the soft processor, soft processor debug unit, and bus bridge. According to an embodiment of the system designer 700, the synthesis unit 730 takes a conceptual HDL design definition and generates an optimized logical representation of the system. The optimized logical representation of the system generated by the synthesis unit 730 may include a representation that has a reduced number of functional blocks and registers, such as logic gates and logic elements, required for the system. Alternatively, the optimized logical representation of the system generated by the synthesis unit 730 may include a representation that has a reduced depth of logic and that generates a lower signal propagation delay.

The synthesis unit 730 also performs technology mapping. Technology mapping involves determining how to implement the functional blocks and registers in the optimized logic representation utilizing specific resources such as cells on a target device thus creating an optimized "technology-mapped" netlist. The technology-mapped netlist illustrates how the resources (cells) on the target device are utilized to implement the system. In an embodiment where the target device is an FPGA, the technology-mapped netlist may include cells such as logic array blocks (LABs), registers, memory blocks, digital signal processing (DSP) blocks, input output (IO) elements or other components.

The system designer 700 includes a placement unit 740 that processes the optimized technology-mapped netlist to produce a placement for each of the functional blocks. The placement identifies which components or areas on the target device are to be used for specific functional blocks and registers.

The system designer 700 includes a routing unit 750 that performs routing. The routing unit 750 determines the routing resources on the target device to use to provide interconnection between the components implementing functional blocks and registers of the logic design. According to an embodiment of the present invention, the routing unit 750 generates a bus to connect the bus bridge to the software debug unit to debug the software processor.

The system designer 700 includes a timing analysis unit 760 that performs timing analysis to determine whether timing constraints of the system are satisfied.

The system designer 700 includes an identification unit 770. According to an embodiment of the present invention, the identification unit 770 generates a soft processor debug unit identification file. The soft processor debug unit identification file may be used for programming a memory on the target device to identify the debug components (debug tools) and locations of the debug components on the target device. The soft processor debug unit identification file may include a profile of the debug components associated with the soft processor and their addresses. According to an embodiment of the present invention, a configuration file is also generated for each of the debug components, wherein the configuration file identifies peripheral identification registers for the debug component The system designer 700 includes an assembly unit 780 that performs an assembly procedure that creates a data file that includes the design of the system generated by the system designer 700. The data file may be a bit stream that may be used to program the target device. The assembly unit 780 may output the data file so that the data file may be stored or alternatively transmitted to a separate machine used to program the target device. It should be appreciated that the assembly unit 780 may also output the design of the system in other forms such as on a display device or other medium.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification, embodiments of the invention have been described with reference to specific exemplary embodiments thereof. It will, however, be evident that various modifications and changes may be made thereto without departing from the broader spirit and scope of the embodiments of the invention. For example, path delays were described as being identified from delay per element functions generated from voltage functions of signals. It should be appreciated that other delay-impacting parameter functions may be used in place of or in addition to voltage functions. Other delay-impacting parameters may include temperature, and other parameters. The specification and drawings are, accordingly, to be regarded in an illustrative rather than restrictive sense.

What is claimed is:

1. A hybrid field programmable gate array (FPGA), comprising
a soft processor and a soft processor debug unit implemented by programmable logic on the FPGA;
a system on a chip (SOC) that includes a hard processor and a hard processor debug unit; and
a bus bridge, coupled to an input output (IO) of the FPGA, that transmits data between the IO and the soft processor debug unit and the hard processor debug unit.

2. The hybrid FPGA of claim 1, wherein the hard processor debug unit comprises a memory that identifies tools available on the hard processor debug unit for debugging the hard processor.

3. The hybrid FPGA of claim 1, wherein the hard processor debug unit comprises a memory that identifies another memory that identifies tools available for debugging one of the hard processor and another processor.

4. The hybrid FPGA of claim 1, wherein the soft processor debug unit comprises a memory that identifies tool available for debugging the soft processor.

5. The hybrid FPGA of claim 4, wherein the memory identifies a close trigger interface that halts operation of the soft processor.

6. The hybrid FPGA of claim 1, further comprising a dedicated bus connecting the bus bridge to the soft processor debug unit.

7. The hybrid FPGA of claim 1, wherein the bus bridge comprises an address decoder that identifies data to transmit to the soft processor debug unit and to the hard processor debug unit.

8. The hybrid FPGA of claim 1, wherein the bus bridge comprises a data multiplexing unit that formats data from the soft processor and the hard processor out the IO in a single data stream.

9. The hybrid FPGA of claim 1, wherein the bus bridge transmits the data from the IO to the soft processor debug unit.

10. A method for designing a system on a target device, comprising:
synthesizing a design for the system which includes a software debug unit with tools to debug a soft processor in the system;
placing the system on the target device;
routing the system on the target device; and
generating a debug unit identification file for programming a memory on the target device to identify the tools and locations of the tools on the target device.

11. The method of claim 10, further comprising generating a configuration file for each of the tools, wherein the configuration file identifies peripheral identification registers for a tool.

12. The method of claim 10, wherein one of the tools comprises a close trigger interface that holds operation of the processor.

13. The method of claim 10, wherein the soft processor is implemented by programmable logic on the target device.

14. The method of claim 10, wherein the target device comprises a system on a chip that includes a hard processor and tools to debug the hard processor.

15. The method of claim 14, wherein the target device comprises a bus bridge coupled to an input output (IO) of the target device for routing data between the IO and the tools to debug the soft processor and the tools to debug the hard processor.

16. The method of claim 15, wherein routing the system on the target device comprises generating a bus to connect the bus bridge to the tools to debug the software processor.

17. A method for debugging a system, comprising:
reading a first memory on a system on a chip (SOC) on a field programmable gate array to identify tools available to debug a hard processor on the SOC; and
reading a second memory, on the FPGA and external to the SOC, identified by the first memory to identify tools available to debug a soft processor implemented using programmable logic on the FPGA.

18. The method of claim 17, further comprising building a graphical user interface for each tool available to debug the soft processor.

19. The method of claim 17, wherein reading the second memory to identify tools available to debug the soft processor comprises reading an identity of a tool type and a location of the tools.

20. The method of claim 17, further comprising transmitting data between a host debugger, external to the FPGA, and the tools available to debug the hard processor and the tools available to debug the soft processor via a bus bridge on the SOC.

21. The method of claim 17, further comprising receiving data from the tools available to debug the hard processor and the tools available to debug the soft processor via a bus bridge on the SOC on a single data stream.

22. The method of claim 17, further comprising reading up to an nth memory identified by one of n−1 previously read memories to identify tools available to debug processors on the system, wherein n is a number of processors supported by the system.

* * * * *